Figure 2:
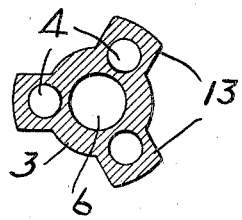

March 25, 1941.   E. A. FORSBERG   2,235,873
CENTRIFUGAL BOWL
Filed June 3, 1938

WITNESS:
Rob't R. Kitchel.

INVENTOR
Erik August Forsberg
BY
Busser and Harding
ATTORNEYS.

Patented Mar. 25, 1941

2,235,873

UNITED STATES PATENT OFFICE 2,235,873

CENTRIFUGAL BOWL

Erik August Forsberg, Nockeby, Sweden, assignor to The De Laval Separator Company, New York, N. Y., a corporation of New Jersey Application June 3, 1938, Serial No. 211,515
In Sweden June 11, 1937

2 Claims. (Cl. 233—40)

Centrifugal bowls of hand separators for the treatment of milk are usually provided with a so-called bowl body, comprising a bowl bottom and, fixed thereto, a central tube which is threaded at its upper end to receive a so-called bowl nut by means of which the various parts of the bowl are held together in proper relation. The whole milk is fed into the central tube from above in the form of a free jet. In the sides of the tube are generally provided slot-shaped openings through which the milk is conducted into the chamber of the bowl surrounding the central tube. Around the tube is usually arranged a so-called distributor comprising milk channels through which the said slot-shaped openings in the central tube communicate with distributing channels in a pile of discs within the bowl chamber. This distributor, which is drawn off the central tube when the bowl is disassembled, has the advantage that said milk channels become free after the disassembling and therefore are conveniently accessible for cleaning. On the other hand, there is the disadvantage that the whole milk easily escapes through the clearance which must be provided between the central tube and the distributor and is then mixed with the separated cream, which is thus diluted. Frequently the distributor sticks to the central tube so that it can only with difficulty, or perhaps not at all, be drawn off the tube at the cleaning of the bowl. The tin coating on the surface of the tube may also finally be scraped off, which entails the danger of rust attacks.

Distributors have not been, however, always used in connection with centrifugal bowls. In some centrifuges the milk is conducted from the central tube through straight more or less oblique bored channels, extending from the supply chamber in the central tube to the distributing channels in the pile of discs. This construction, however, necessitates a substantially greater depth of the supply chamber, which is objectionable because the said chamber then extends beyond the point in the bowl where it is desirable to locate the so-called conveyor and the wall which bounds the supply chamber from the bore for the bowl spindle in the bottom of the bowl. The vertical position of the wall is determined by the point of suspension of the bowl, that is, the point at which the bowl is supported by the spindle. It is desirable to have the point of suspension as close as possible to the center of gravity of the bowl. The construction with straight channels, just described, necessitates a substantially lower point of suspension, which is objectionable. Owing to the lower position of the point of suspension, it is often necessary to arrange a special guide on the lower side of the bowl, which entails an increase of the manufacturing costs.

According to the present invention the inconveniences of the removable distributor are avoided, because the distributor and the central tube are replaced by a single central part, which is in fixed relation with the bowl bottom and may be advantageously integral therewith. By this arrangement, because there is no removable distributor, the advantage is also obtained that the radial dimension of the central tube may be substantially increased so that the part becomes considerably stronger and better resists mechanical action. The new part may thus be described as a substantially reinforced central tube, and the reinforcement is located at the point where it is most required, namely, where the tube joins the bowl bottom. This reinforcement is of great value when the bowl body is made of bronze or similar material. In this type of bowl the central tube is usually integral with the bowl bottom, and experience has shown that the tube, where it joins the bowl bottom, has not sufficient strength to withstand the mechanical stresses to which it may sometimes be subjected. With the reinforcement obtained according to the invention the construction becomes sufficiently sturdy when the bowl body is made of bronze or the like.

With a reinforced central tube according to the invention the milk channels can no longer be made, as has heretofore been common practice, in the form of grooves located on the inner side of the distributor and which, during operation, form closed channels together with the central tube. According to the invention the milk channels are obliquely bored in the reinforced central tube. As the shape of the reinforced central tube does not permit the channels to be in the form of straight bores extending from the inlet chamber of the bowl to the orifices of the distributing channels arranged in the pile of discs, each of the milk channels in the central tube is composed of two bore holes communicating with each other. One of these is bored from the bottom of the bowl obliquely upwards. The second channel is bored radially of the bowl and at an angle to the first channel, preferably after the first has been plugged. The boring should preferably be made with drills having a round-section point, because it is important to avoid the formation of pockets at those places in the channel where the two bores meet. With the ordinary taper-point bores, such pockets can hardly be avoided, and in any case the surface of one bore meets that of the other more or less abruptly at the point where the two bores meet. These abrupt transitions may be avoided by using drills with round-section points.

At the point where the two bores meet, even though it be at an obtuse angle, a sharp corner remains on the outside of the channel after the drilling. This sharp corner may be subsequently worked off and rounded by means of a suitable cutter-like tool.

Figure 1:
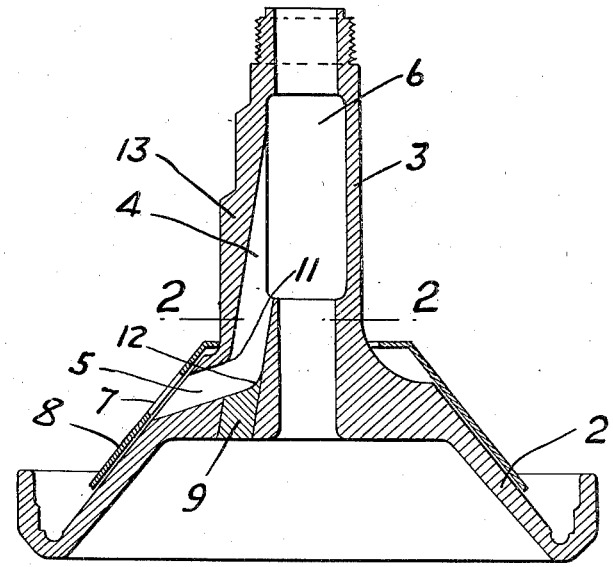

The accompanying drawing is a vertical sectional view of a bowl bottom and central tubular shaft constituting a preferred embodiment of the invention. Fig. 2 is a cross-section on the line 2—2 of Fig. 1. The conical lower portion 2 of the bowl body is the bottom of the bowl. In fixed relation therewith—it may be integral therewith as shown—is a central tube 3. The tube 3 is preferably provided with spaced apart longitudinal ribs 13 within each of which is bored a flow hole 4, which unites with a flow hole 5, bored in the bowl bottom, to form a channel for conducting to the bowl chamber the liquid to be treated therein. The junction of flow holes 4 and 5 forms a knee whereat the direction of the channel is changed. By the said channel the inlet chamber 6 within the tubular shaft 3 communicates with a hole 7 arranged in the lowermost disc 8 in the bowl chamber.

The flow hole 4 is bored from below and through the bowl bottom, at a slight angle to the vertical, to the chamber 6. The hole in the bowl bottom is closed by means of a plug 9. The flow hole 5 is bored through the bowl bottom, that is, through the thick part of the bowl body connecting the bowl bottom and the longitudinal rib 13. The sharp edge remaining at 11 after the boring is then rounded with a suitable cutter tool. If a drill having a suitable point is used, a rounded surface may be obtained in the channel at 12 in the drilling operation. In order to obtain fully smooth surfaces in the channel it is, however, advantageous to finish the surfaces with a reamer. To obtain a completely even surface at 12 it is thus suitable to use a reamer or a cutter shaped to correspond to the surface desired to be formed.

What I claim and desired to protect by Letters Patent is:

1. A centrifugal bowl comprising a bowl body including a bowl bottom and a central tubular shaft in fixed relation therewith and containing distributing channels for passage of liquid from the tubular shaft to the bowl chamber, each of such channels comprising a straight bore hole open at its upper end to the interior of the tubular shaft and extending down at a small angle to the vertical through the wall of the tubular shaft and into the bowl bottom but terminating short of the lower face thereof and a straight flow hole in the bowl bottom extending at a small angle to the horizontal and opening at its outer end to the lower part of the bowl chamber inlet and at its inner end meeting at an obtuse angle the said bore hole, the lower edge of the flow hole aligning with the bottom of the bore hole.

2. A centrifugal bowl comprising a bowl body including a bowl bottom and a central tubular shaft in fixed relation therewith and containing distributing channels for passage of liquid from the tubular shaft to the bowl chamber, each of such channels comprising a straight bore hole open at its upper end to the interior of the tubular shaft and extending down at a small angle to the vertical through the wall of the tubular shaft and into the bowl bottom but terminating short of the lower face thereof and a straight flow hole in the bowl bottom extending at a small angle to the horizontal and opening at its outer end to the lower part of the bowl chamber inlet and at its inner end meeting at an obtuse angle the said bore hole, the lower edge of the flow hole aligning with the bottom of the bore hole, the bowl bottom below said bore hole and aligning therewith comprising a plug closing a hole aligning with said bore hole.

ERIK AUGUST FORSBERG.